United States Patent
Aweya et al.

(10) Patent No.: US 7,492,732 B2
(45) Date of Patent: Feb. 17, 2009

(54) DIFFERENTIAL CLOCK RECOVERY IN PACKET NETWORKS

(75) Inventors: James Aweya, Kanta (CA); Michel Ouellette, Orleans (CA); Delfin Montuno, Kanata (CA); Kent Felske, Kanta (CA)

(73) Assignee: Nortel Networks Limited, St Laurent, Quebec (CA)

( * ) Notice: Subject to any disclaimer, the term of this patent is extended or adjusted under 35 U.S.C. 154(b) by 402 days.

(21) Appl. No.: 11/294,146

(22) Filed: Dec. 5, 2005

(65) Prior Publication Data

US 2007/0097902 A1    May 3, 2007

Related U.S. Application Data

(60) Provisional application No. 60/732,276, filed on Nov. 1, 2005.

(51) Int. Cl.
*H04B 7/212* (2006.01)
(52) U.S. Cl. .................. 370/321; 370/347; 370/535
(58) Field of Classification Search ............... 370/321, 370/535, 347, 350, 362, 485, 503, 545, 516–519; 709/231; 375/240.28, 361, 295, 371, 326–327, 375/373, 376
See application file for complete search history.

(56) References Cited

U.S. PATENT DOCUMENTS

| | | | |
|---|---|---|---|
| 6,980,586 B1 * | 12/2005 | Ballinger | 375/150 |
| 7,010,074 B2 * | 3/2006 | Nakamura | 375/371 |
| 7,203,240 B2 * | 4/2007 | Kim et al. | 375/240.28 |
| 2004/0114632 A1 * | 6/2004 | Yuuki et al. | 370/503 |
| 2006/0245453 A1 * | 11/2006 | Bedrosian | 370/503 |
| 2007/0097947 A1 * | 5/2007 | Aweya et al. | 370/350 |
| 2007/0206643 A1 * | 9/2007 | Egan et al. | 370/479 |
| 2007/0279408 A1 * | 12/2007 | Zheng et al. | 345/213 |

* cited by examiner

*Primary Examiner*—Pablo N Tran
(74) *Attorney, Agent, or Firm*—Anderson Gorecki & Manaras LLP

(57) ABSTRACT

Where a common network clock is available at both a TDM receiver and a TDM transmitter which communicate via a packet network, differential clock recovery can be accomplished by matching the number of service clock pulses in a network reference clock period at the transmitter and receiver. In one embodiment the transmitter need only send a counter value from a counter that is clocked and reset, respectively, by the service clock and network reference clock, thereby allowing use of different types of oscillators, both analog and digital, to be implemented at the transmitter and receiver. The technique is also general enough to be applied in a wide variety of packet networks including but not limited to IP, MPLS and Ethernet. In an alternative embodiment, a faster derived network clock $f_{dnc}$ drives both the transmitter and receiver counters, which in turn are reset, respectively by the slower transmitter service clock $f_{sc}$ and slower receiver service clock $f_{rc}$.

9 Claims, 5 Drawing Sheets

DIFFERENTIAL CLOCK RECOVERY IN PACKET NETWORKS

CROSS-REFERENCE TO RELATED APPLICATIONS

A claim of priority is made to U.S. provisional patent application Ser. No. 60/732,276, entitled TECHNIQUE FOR DIFFERENTIAL CLOCK RECOVERY IN PACKET NETWORKS, filed Nov. 1, 2005, which is incorporated by reference.

FIELD OF THE INVENTION

This invention relates generally to the field of network communications, and more particularly to Circuit Emulation Service.

BACKGROUND OF THE INVENTION

Circuit Emulation Service ("CES") allows time division multiplexing ("TDM") services such as DS-n and E-n circuits to be transparently extended across a packet network. With circuit emulation over IP, for example, TDM data received from an external device at the edge of an Internet Protocol ("IP") network is converted to IP packets, sent through the IP network, passed out of the IP network to its destination, and reassembled into a TDM bit stream. One application of CES is the interconnection of enterprise private telephone networks at different sites. For example, CES over a packet network can be used to connect two private branch exchanges ("PBXs") on two different campuses without having packet transport capabilities on the PBXs themselves. This inter-working allows voice traffic between the two campuses to use a packet network backbone instead of leased TDM lines, and also allows voice and data traffic to use the same packet network.

In order for CES to function properly it is desirable to achieve the same clock in both the transmitting and receiving ends of a TDM circuit from end-to-end such that, for example, the T1 stream of a downstream PBX transmits with the clocking characteristics as the T1 stream of the upstream PBX. Known clocking techniques include both synchronous and asynchronous clocking modes, of which the asynchronous clocking modes include Differential Clock Recovery, Independent Clocking, Clock Recovery using Simple Timestamps, Adaptive Buffer-Fill-based Clock Recovery, and Adaptive Packet Inter-arrival Time Averaging-based Clock Recovery.

Differential clock recovery is typically used when there are multiple independent source clocks in a network and there is a requirement that interfaces that are already synchronized to the different source clocks be allowed to inter-work but still maintain their timing traceability to their individual source clocks. As an example, differential clocking can be used when a packet network is already synchronized to a reference source, the network clock, and then a service interface such as a PBX interface that receives its clocking from another reference source, the service clock, is connected to the packet network. To avoid resynchronizing the packet network to the service clock in the course of TDM data transport through the packet network, differential clock recovery allows the receiving service interface, i.e., the receiver, to recover the transmitting interface, i.e., the transmitter, service clock using the common network clock of the packet network available at the transmitter and receiver service interfaces.

Referring to FIG. 1, CES can be supported by a synchronous residual timestamp ("SRTS") method of differential clock recovery where a TDM transmitter such as a PBX (100) communicates with a TDM receiver such as a PBX (102) via a packet network (104). A service clock timing signal $f_{sc}$ is provided to the edge PBXs (100, 102) independently from the packet network. Inter-working functions ("IWFs") (108, 110) are driven by a network clock $f_{nc}$. In order for PBX (100) to send TDM data to a user at PBX (102), the differential clocking works as follows. At IWF (108), the user introduces TDM traffic into the packet network according to the service clock signal $f_{sc}$. As IWF (102) segments the TDM bit stream into packets, it measures the difference between the service clock $f_{sc}$ which drives it and the network clock $f_{nc}$. Then, as IWF (102) generates packets it incorporates this time difference or residual time stamp ("RTS") value into every eighth packet. The packets are then propagated through the packet network to IWF (110). As IWF (110) receives the packets, it assembles the packets into the original TDM bit stream and also reconstructs the user service clock timing signal $f_{sc}$ from the RTS value carried within every eighth packet. IWF (110) reconstructs the clock by adjusting the network clock $f_{nc}$ by the RTS. Thus, during SRTS clocking the TDM traffic is synchronized between the ingress (segmentation) side of the circuit emulation and the egress (reassembly) side of the circuit according to service clock signal $f_{sc}$, while the packet network continues to function according to clock $f_{nc}$.

SUMMARY OF THE INVENTION

In accordance with one embodiment of the invention, a method for differential clock recovery in a network having first and second Time Division Multiplexing ("TDM") segments interconnected by a non-TDM segment, where a first service clock is available to the first TDM segment, the same first service clock is to be recovered at the second TDM segment, and a reference clock is available at both the first and second TDM segments, the method comprising the steps of: in the first TDM segment, measuring a number of first service clock pulses occurring in a first clock period defined by the reference clock; indicating, to the second TDM segment, the number of measured first service clock pulses occurring in the period defined by the reference clock; in the second TDM segment, measuring a number of second service clock pulses occurring in a second clock period defined by the reference clock; determining a difference between the number of measured first service clock pulses and the number of measured second service clock pulses; and employing the difference to recover the first service clock in the second TDM segment.

In accordance with an alternative embodiment of the inventions, a method for differential clock recovery in a network having first and second Time Division Multiplexing ("TDM") segments interconnected by a non-TDM segment, where a first service clock is available to the first TDM segment, the same first service clock is to be recovered at the second TDM segment, and a reference clock is available at both the first and second TDM segments, the method comprising the steps of: in the first TDM segment, measuring a number of reference clock pulses occurring in a first period defined by the first service clock; indicating, to the second TDM segment, the number of measured reference clock pulses occurring in the first clock period defined by the first service clock; in the second TDM segment, measuring a number of reference clock pulses occurring in a second clock period defined by the second service clock; determining a difference between the number of measured reference clock pulses occurring in a first clock period and the number of measured reference clock pulses occurring in a second clock period; and employing the difference to recover the first service clock in the second TDM segment.

Differential clock recovery in accordance with the invention has advantages over SRTS. For example, the invention provides flexibility in selection of the sampling period of clock state values from the transmitter to the receiver. The invention also allows clock state values to be sampled as often as dictated by the loop filter constraints at the receiver PLL. SRTS, in contrast, is more tightly bound to ATM in that it requires that the RTS value is specified using four bits and be sent per eight cells using one bit in the AAL1 header for every odd sequence numbered cell. Although, SRTS might be adapted to work in a general packet network like one using IP, this would require redesigning the underlying design parameters of the SRTS scheme to suit IP networking. Unlike SRTS, the differential clocking technique of this invention also supports fixed size and variable size packets as well as constant bit rate ("CBR") and variable bit rate traffic ("VBR") packet transport. Further, the transmitter clock state values can be sent in-band or out-of-band. For example, in-band can be done using the timestamp field in the RTP packet header and out-of-band can be done using RTCP packets. SRTS mandates in-band transmission of the RTS values because the RTS value is specified using four bits and is sent per eight cells using one bit in the AAL1 header for every odd sequence numbered cell. Further, because the invention only requires transmission of a clock state in the form of counter samples and the clock recovery based on transmitter/receiver counter state differences, it is general enough to be applied to a wide variety of packet networks including but not limited to IP, MPLS, and Ethernet. For the same reason the inventive technique allows different types of oscillators, analog or digital, to be employed at the transmitter and receiver. Consequently, interoperability between different implementations from different vendors and customization are enhanced.

DETAILED DESCRIPTION

Figure 1:
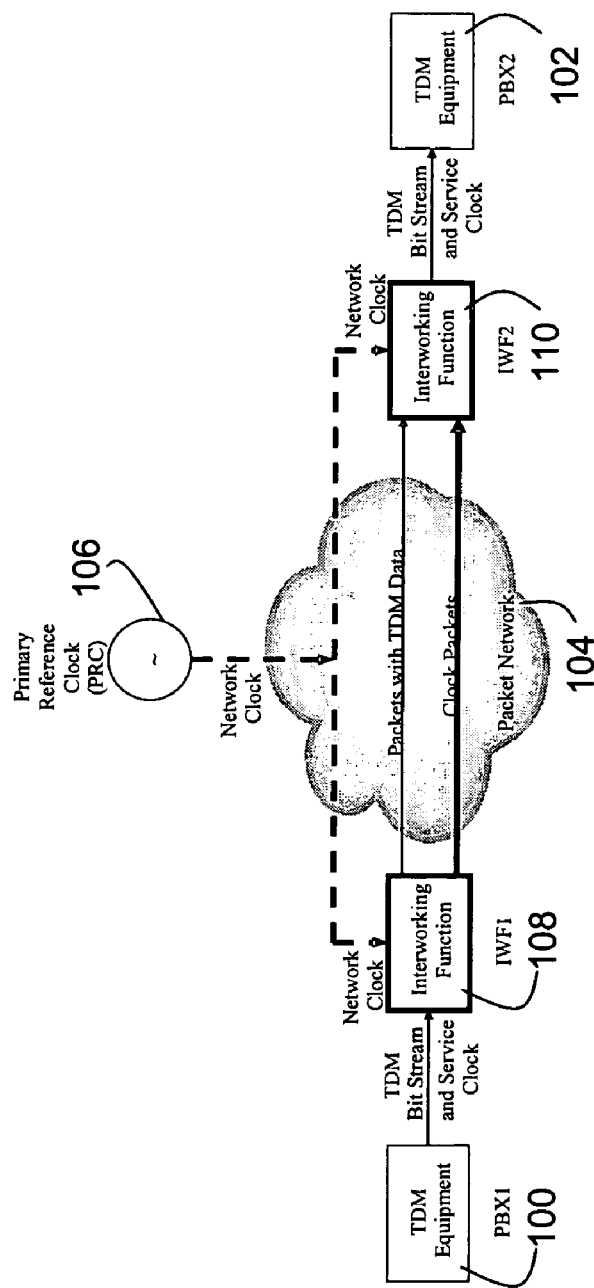
FIG. 1 is a prior art diagram of synchronous residual timestamp ("SRTS") differential clock recovery in a communications network.
Figure 2:
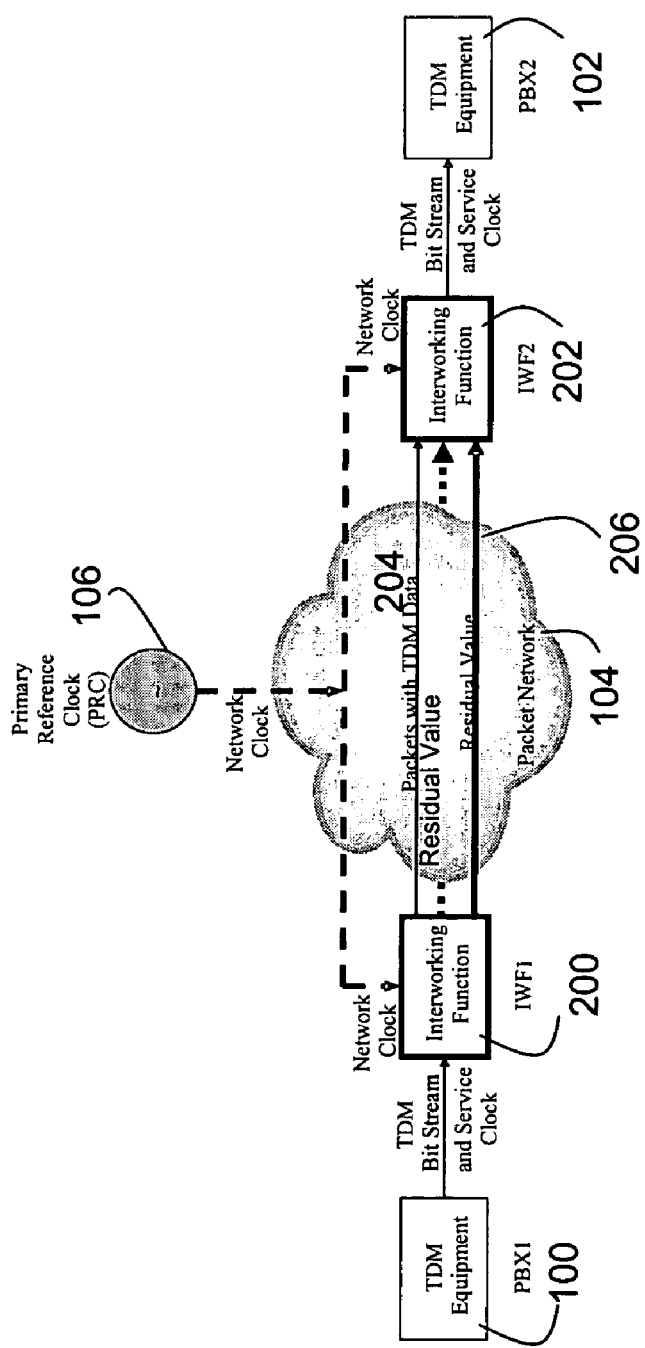
FIG. 2 is a diagram of one embodiment of differential clock recovery in accordance with the invention.
Figure 3:
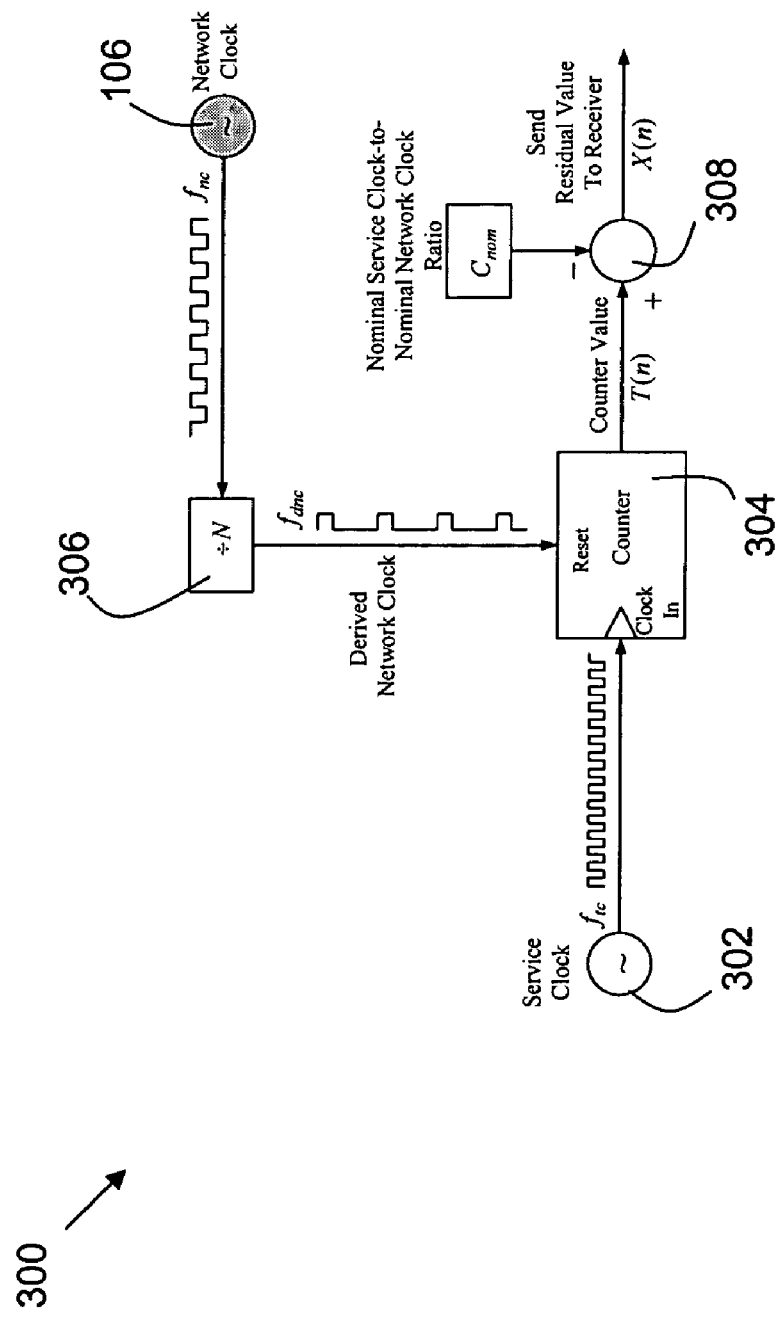
FIG. 3 illustrates the transmitter-side inter-working function of FIG. 2 in greater detail.
Figure 5:
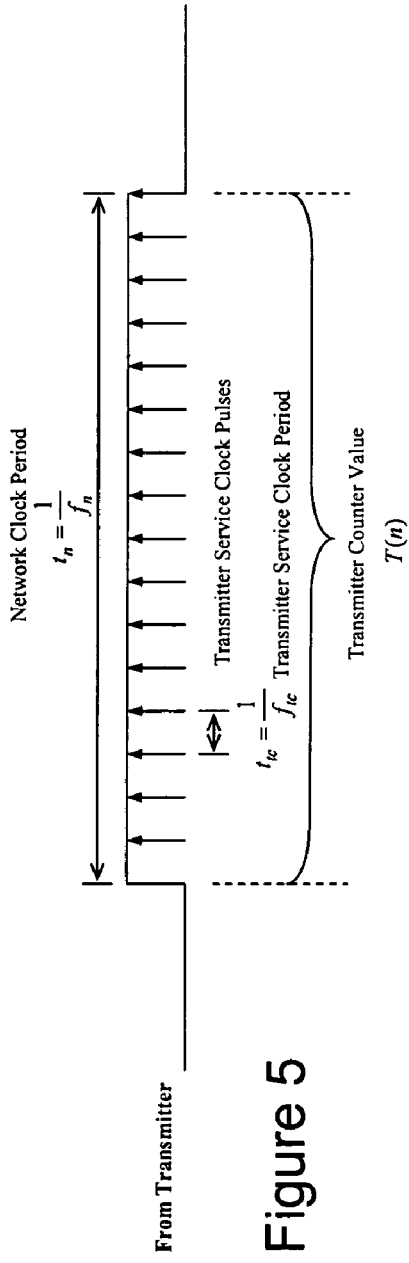
FIGS. 5 and 6 illustrate service clock pulses and counter values where the transmitter service clock is faster than the receiver service clock.

Referring to FIGS. 2, 3 and 5, a technique for differential clock recovery employs novel inter-working functions (200, 202) at both the transmitter side and receiver side of the packet network (104). At a clocking unit (300) in the transmitter side inter-working function (200), a faster service clock (302) with frequency $f_{sc}$ (e.g., 1.544 MHz) drives a counter (304) which is in turn reset by a much slower derived network clock (106) with frequency $f_{dnc}$ (e.g., 4 KHz), i.e., derived via function (306). The ratio between the nominal service clock frequency to that of the derived network clock is denoted as $C_{nom}=f_{sc\_nom}/f_{dnc\_nom}$. The clock periods of the derived network clock $t_{dnc}=1/f_{dnc}$ are measured by the counter (304) which is continuously clocked by the service clock $f_{sc}$. Hence, the counter measures the number of service clock pulses in a derived network clock period $t_{dnc}$.

Each derived network clock pulse latches out the counter content, zeros it, and resets it to start counting again. The counter value T(n), where n=1, 2, 3K, is the discrete-time instant the counter value is latched out. A residual value, $X(n)=T(n)-C_{nom}$, is generated by employing a difference function (308). The residual value is sent to the receiver, either in-band via packets with TDM data (204) or out-of-band via a separate channel (206).

Figure 4:
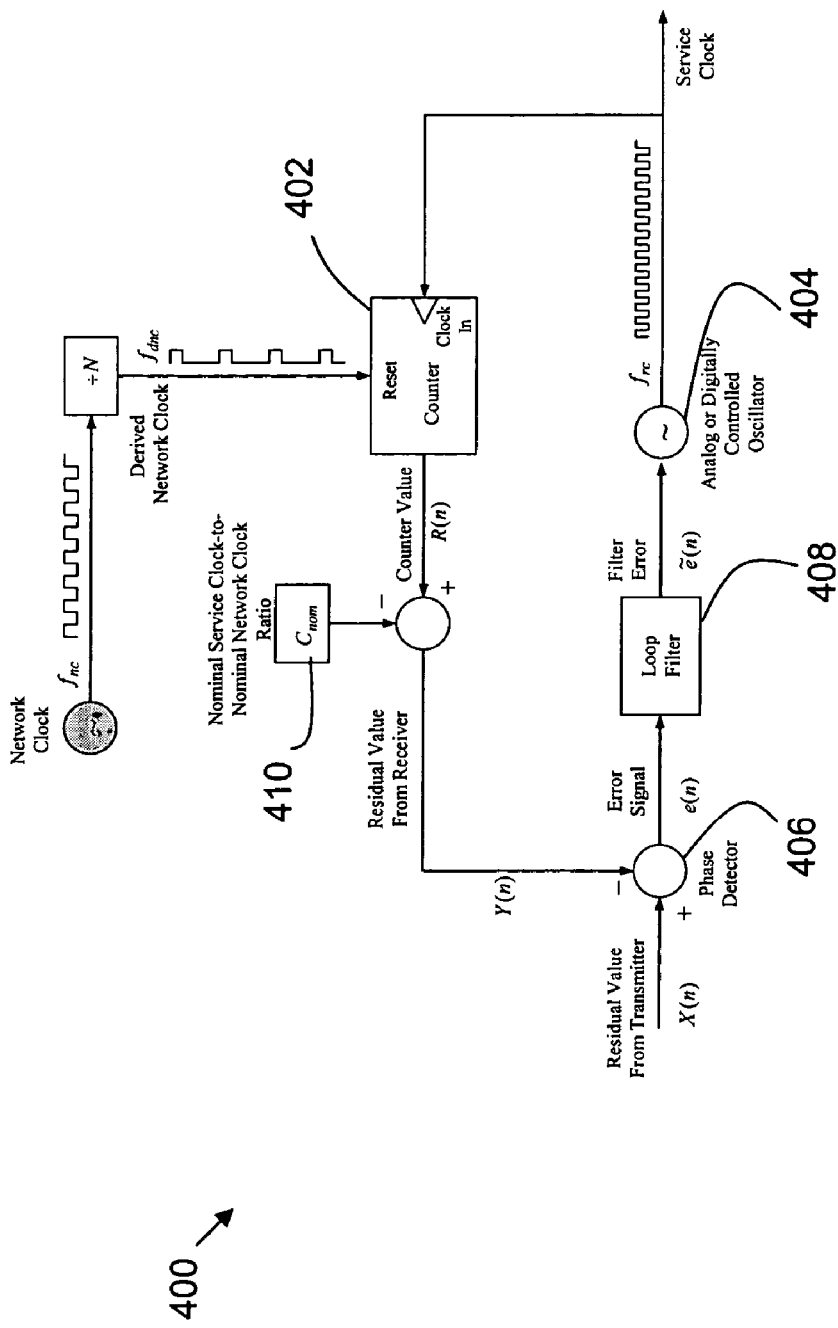
FIG. 4 illustrates the receiver-side inter-working function of FIG. 2 in greater detail.
Figure 6:
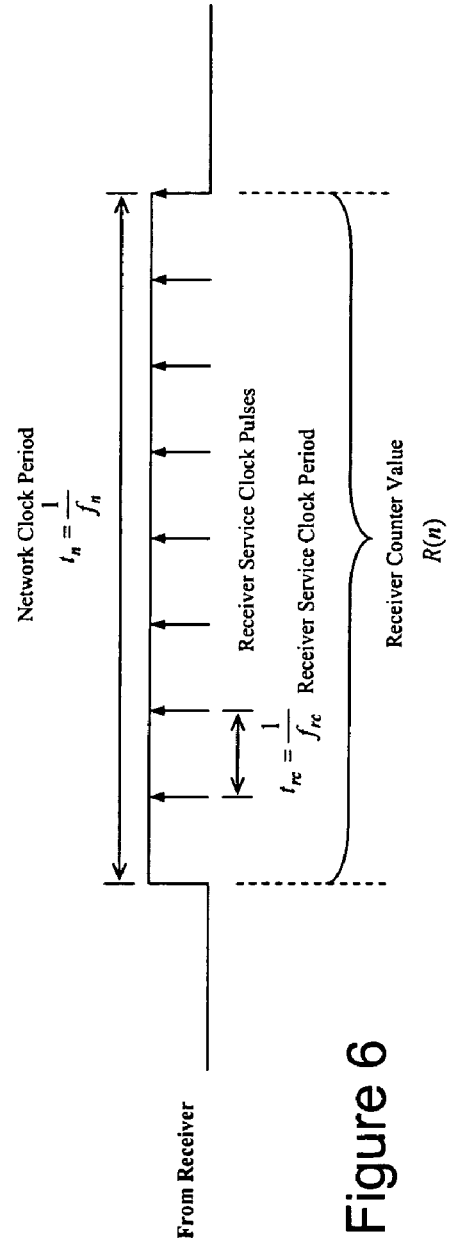

Referring now to FIGS. 2, 4 and 6, a clocking recovery unit (400) in the receiver-side inter-working function (202) is basically a closed-loop control system with an embedded counter (402) that works to control a local oscillator (404) to produce the same number of service clock pulses in the derived network clock pulse as the transmitter. The receiver clocking recovery unit is a digital phase-locked loop ("DPLL") having a phase detector ("PD") (406), digital loop filter (408), an analog or digitally controlled oscillator (404), a service clock-driven counter (402), and the optional counter offset factor $C_{nom}$ function (410). At a discrete time instant n, the phase detector (406) measures the phase difference between the transmitter clock counter value X(n) and the local receiver clock counter value Y(n) to form an error signal $e(n)=X(n)-Y(n)$. The loop filter (408) then filters out the high-frequency noise components in the error e(n) and also in the control loop to produce a filtered error signal ẽ(n). The filtered error signal ẽ(n) is then used to control the frequency of the oscillator (404). The filtered error signal ẽ(n) causes the controlled oscillator frequency $f_{rc}$ to move in a direction so as to equal the transmitter service clock frequency $f_{sc}$. In the synchronized or locked state, the error signal e(n) becomes zero or a negligibly small random value.

Referring now to FIGS. 5 and 6, the clock state samples that are sent to the receiver can be in any of various forms provided the receiver generates its local values in a corresponding form, e.g.:

The transmitter counter value T(n) can be sampled every s seconds and sent to the receiver.

The transmitter counter value T(n) can be summed over a window of length k, this is, $\Sigma_{n=1}^{k}T(n)$, and sent to the receiver. Note that in this case the sampling period (to be defined later) is $T_s=k/f_{dnc\_nom}$.

The preferred technique is to send the clock state information in one of the following forms:

Knowing the nominal counter value $C_{nom}$, the transmitter counter value T(n) can be sampled every s seconds and only the difference $X(n)=C_{nom}-T(n)$ is sent to the receiver.

The transmitter counter value T(n) can be summed over a window of length k, this is, $\Sigma_{n=1}^{k}T(n)$, then the difference from the summed nominal value, that is, $X(n)=kC_{nom}-\Sigma_{n=1}^{k}T(n)$ is sent to the receiver. The sampling period is also $T_s=k/f_{dnc\_nom}$.

It is advantageous in sending X(n) values rather than T(n) because of the smaller number of bits required in the clocking packets to transport X(n). The operations of the phase detector can then be performed directly using X(n) and Y(n) values, since $X(n)-Y(n)=T(n)-R(n)$.

In an alternative embodiment a faster derived network clock $f_{dnc}$ drives both the transmitter and receiver counters, which in turn are reset, respectively by the slower transmitter service clock $f_{sc}$ and slower receiver service clock $f_{rc}$. As with the embodiment described above, the residual value from the transmitter TDM segment is sent to the receiver TDM segment and the difference is employed to recover the first service clock. Those skilled in the art will recognize that this alternative embodiment may be implemented with the same structure as the first embodiment, albeit with different interconnections.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method for differential clock recovery in a network having first and second Time Division Multiplexing ("TDM") segments interconnected by a non-TDM segment, where a first service clock is available to the first TDM segment, the same first service clock is to be recovered at the second TDM segment, and a reference clock is available at both the first and second TDM segments, the method comprising the steps of:

in the first TDM segment, measuring a number of first service clock pulses occurring in a first clock period defined by the reference clock;

indicating, to the second TDM segment, the number of measured first service clock pulses occurring in the clock period defined by the reference clock;

in the second TDM segment, measuring a number of second service clock pulses occurring in a second clock period defined by the reference clock;

determining a difference between the number of measured first service clock pulses and the number of measured second service clock pulses; and employing the difference to recover the first service clock in the second TDM segment.

2. The method of claim 1 further including the step of employing the difference to synchronize a circuit in the second TDM segment with a corresponding circuit in the first TDM segment.

3. The method of claim 1 further including the step of deriving a lower frequency network clock from the reference clock at the first TDM segment.

4. The method of claim 3 further including the step of, in the first TDM segment, employing a counter to measure pulses of the first service clock, and resetting the counter with the derived clock.

5. The method of claim 4 further including the steps of comparing a counter value for the first period with a nominal reference value, and transmitting an indication of the difference to the second TDM segment.

6. The method of claim 5 further including the step of deriving a lower frequency network clock from the reference clock at the second TDM segment.

7. The method of claim 6 further including the step of, in the second TDM segment, employing a counter to measure pulses of the second service clock, and resetting the counter with the derived clock.

8. The method of claim 7 further including the steps of comparing a counter value for the second clock period with a nominal reference value, and comparing the difference with the difference transmitted from the first TDM segment to produce an error signal.

9. The method of claim 8 further including the step of employing a loop filter and an oscillator to synchronize the second service clock with the first service clock based on the error signal.

* * * * *